United States Patent
Katragadda et al.

(10) Patent No.: US 9,562,604 B2
(45) Date of Patent: Feb. 7, 2017

(54) AXLE HEAT ABSORBER

(71) Applicant: Ford Global Technologies, LLC, Dearborn, MI (US)

(72) Inventors: Sunil Katragadda, Canton, MI (US); W. Cary Cole, Livonia, MI (US); Michael Levin, Ann Arbor, MI (US); Furqan Zafar Shaikh, Troy, MI (US); Danrich Henry Demitroff, Okemos, MI (US); Mathew John Fast, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/693,350

(22) Filed: Apr. 22, 2015

(65) Prior Publication Data

US 2016/0312878 A1  Oct. 27, 2016

(51) Int. Cl.
*F16H 57/04* (2010.01)
*B60B 35/16* (2006.01)
*F28D 15/00* (2006.01)

(52) U.S. Cl.
CPC .......... *F16H 57/0417* (2013.01); *B60B 35/16* (2013.01); *F16H 57/0483* (2013.01); *F28D 15/00* (2013.01)

(58) Field of Classification Search
CPC .. F16H 57/0417; F16H 57/0483; F28D 15/00; F28D 15/02; F28D 15/0266; F28D 15/0233; F28D 15/0275; Y10T 74/2188; Y10T 74/2189; F01M 2011/0025; F28F 2215/06; B60B 35/16
See application file for complete search history.

(56) References Cited

U.S. PATENT DOCUMENTS

| | | | | |
|---|---|---|---|---|
| 4,393,922 A | * | 7/1983 | Bahrle | F16H 57/0415 123/41.33 |
| 6,062,302 A | * | 5/2000 | Davis | F28D 15/02 165/104.21 |
| 6,237,223 B1 | * | 5/2001 | McCullough | B23P 15/26 257/E23.089 |
| 2002/0033247 A1 | * | 3/2002 | Neuschutz | F28D 20/02 165/10 |
| 2005/0126749 A1 | * | 6/2005 | Matti | F16H 57/0412 165/41 |

FOREIGN PATENT DOCUMENTS

| | | |
|---|---|---|
| CN | 201566422 U | 9/2010 |
| CN | 202413754 U | 9/2012 |
| CN | 102815266 A | 12/2012 |
| CN | 203254894 U | 10/2013 |
| CN | 203485678 U | 3/2014 |
| DE | 102009036547 A1 | 2/2011 |
| JP | 2009281446 A | 12/2009 |

* cited by examiner

*Primary Examiner* — Thomas Diaz
(74) *Attorney, Agent, or Firm* — James Dottavio; Brooks Kushman P.C.

(57) ABSTRACT

An axle includes a differential, a cover, and a heat absorber. The differential has a ring gear disposed within a housing. The ring gear is configured to pump a lubricating fluid. The cover is attached to the housing. The heat absorber is attached to the cover within a pump path of the ring gear. The heat absorber has a phase-change material disposed within the heat absorber configured to absorb heat from the lubricating fluid. A method to control fluid temperature in a vehicle axle is also included.

11 Claims, 2 Drawing Sheets

AXLE HEAT ABSORBER

TECHNICAL FIELD

The present disclosure relates to vehicle axles. More particularly, the disclosure relates to an axle assembly utilizing a heat absorber with a phase-change material.

BACKGROUND

Vehicle driveline components such as gears, bearings, and other components require lubrication. Various characteristics of the lubricating fluid, such as viscosity, temperature, and fluid levels may affect durability, drivability, and fuel economy. Due to parasitic losses, some energy is converted to heat rather than being transmitted to downstream components. In addition to providing lubrication to minimize the parasitic losses, the fluid transfers the resulting heat away from the gears and bearings. The lubricating fluid may overheat during various operations of the vehicle, such as towing a trailer. Overheating the lubricating fluid may cause damage to the gears, bearings, and other components of the driveline.

SUMMARY

An axle for a vehicle includes housing, and a heat absorber. The housing contains a lubricating fluid. The heat absorber is attached to an interior of the housing and contains a phase-change material. The heat absorber is configured to absorb heat from the lubricating fluid by inducing a phase-change of the phase-change material.

An axle includes a differential, a cover, and a heat absorber. The differential has a ring gear disposed within a housing. The ring gear configured to pump a lubricating fluid. The cover is attached to the housing. The heat absorber is attached to the cover within a pump path of the ring gear. The heat absorber has a phase-change material disposed within the heat absorber configured to absorb heat from the lubricating fluid.

A method to control fluid temperature in a vehicle axle includes attaching a heat absorber to axle housing in a fluid path of a lubricating fluid. The method further includes filling a plurality of protrusions defined on the heat absorber with a phase-change material and pumping fluid across the heat absorber. The method also includes absorbing heat from the fluid by changing a phase of the phase-change material.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
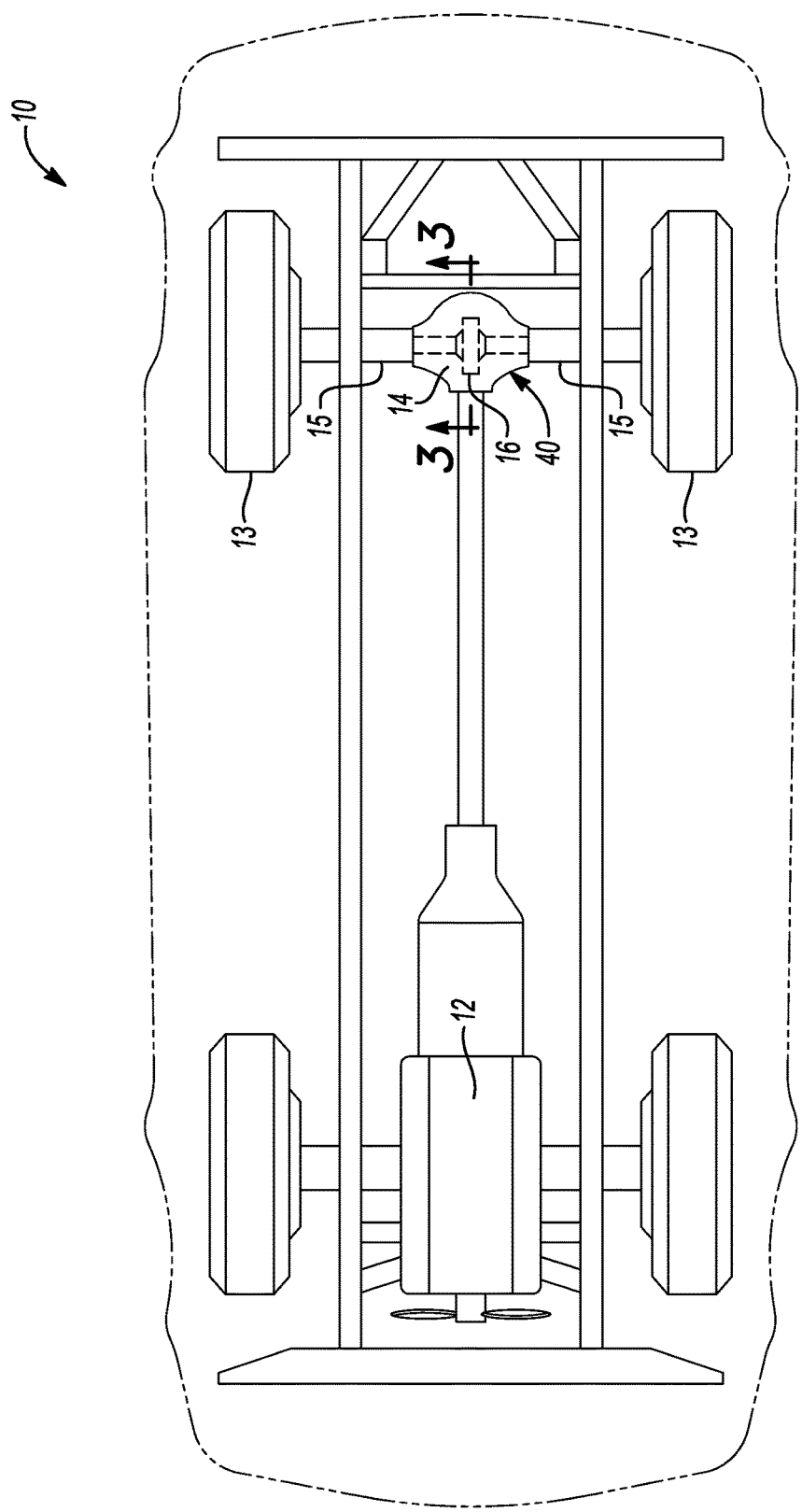
FIG. 1 is a schematic view of a vehicle.

Referring to FIG. 1, a schematic of a vehicle 10 is shown. The vehicle 10 includes an engine/transmission 12, and a rear axle assembly 14 which includes a ring gear 16 and a housing 40. The engine/transmission 12 provides torque to drive ring gear 16. The rear axle assembly 14 transfers torque from the engine/transmission 12 through left and right axle shafts 15 to the rear vehicle wheels 13 while allowing slight differences in wheel speed as the vehicle turns corners. As ring gear 16 spins, it pumps lubricating fluid within the housing 40 to distribute the fluid to various gears and bearings. Pumping the lubricating fluid exerts some parasitic torque on ring gear 16 which decreases the torque transmitted to the wheels 13. This is known as a spin loss because the magnitude is strongly influenced by rotational speed as opposed to transmitted torque. The magnitude is also influenced by the quantity of fluid and the fluid viscosity. It is important to maintain an appropriate level of fluid at an appropriate temperature. When the temperature of the lubricating fluid is cold, the viscosity is high increasing the magnitude of the ring gear spin loss. If the temperature gets too high, the fluid becomes ineffective at removing heat from gears and bearings, causing those components to lose efficiency and wear prematurely. If the temperature increases too much, for example above 145 degrees Celsius, chemical reactions can occur which degrade the effectiveness of the fluid as a lubricant. Increasing the quantity of fluid increases the ring gear parasitic loss and also increases the time required for the fluid temperature to reach a normal operating temperature. Both of these effects decrease fuel economy. However, if the quantity of fluid is too low, the temperature may increase too much during demanding operations such as towing a trailer up a hill.

Figure 2:
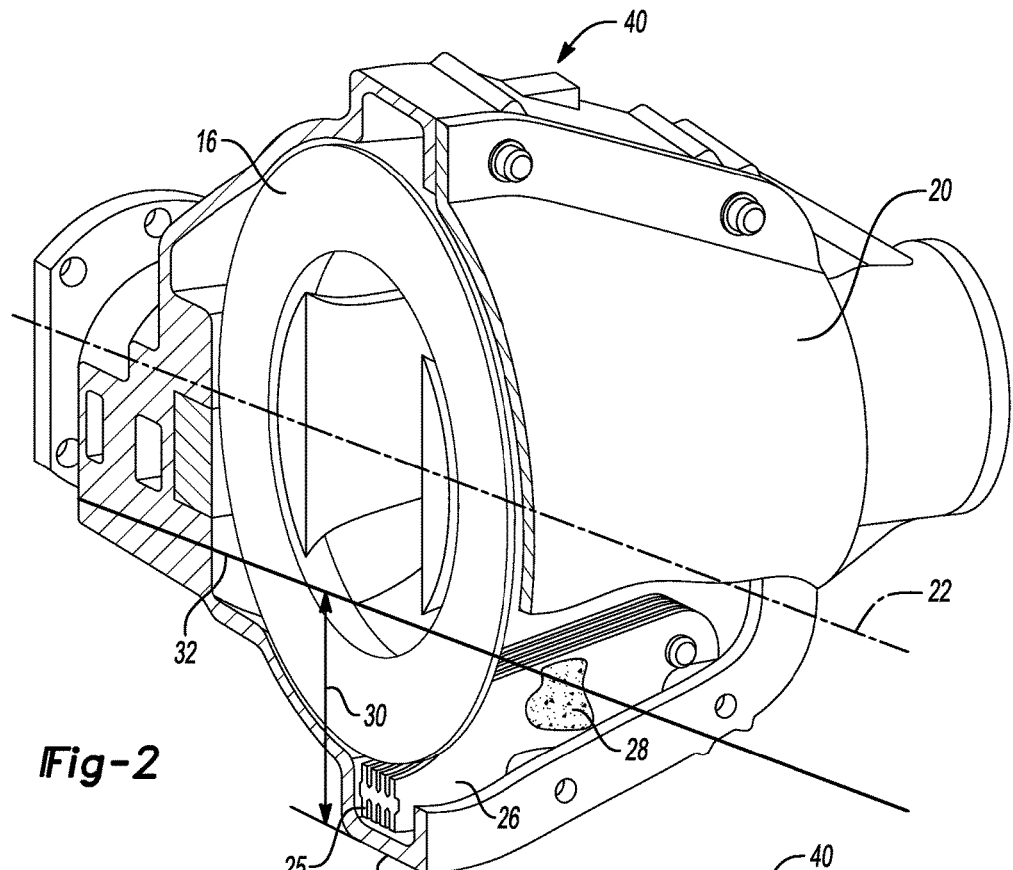
FIG. 2 is an inner perspective view of an axle housing for a vehicle.

FIG. 2 is a cutaway perspective view of a first embodiment of the axle assembly 14 from behind and to the left (driver's side). The housing 40 includes a cover 20 which may be mechanically fastened at the rear of the housing 40 by bolts, for example. When the vehicle is moving forward, ring gear 16 pumps the lubricating fluid across the cover 20. Ring gear 16 may be centered vertically on a central axis 22 that passes through the cover 20. The housing and cover define a sump. Ring gear 16 distributes fluid from the sump to components such as gears and bearing that need lubrication. Gravity causes fluid within the housing to drain to the sump. The level of the fluid when the vehicle is stationary and all fluid has drained to the sump is called the static fluid level 32.

A heat absorber composed of a non-insulating material is fixed to the interior of the housing. In the embodiment of FIG. 2, the heat absorber is located in the sump below the static fluid level. The heat absorber 26 may include a plurality of plates 25 to increase the surface area for convective heat transfer between the lubricating fluid and the heat absorber. In at least one other embodiment, the heat absorber 26 may have a rectangular box shape, an arcuate shape, or other shape. The heat absorber defines an internal cavity which contains a phase-change material 28. The phase-change material 28 may be material capable of changing phase upon reaching a temperature threshold. The phase-change material 28 may include but is not limited to any type of salts, inorganic liquids, or organic liquids.

The phase-change material 28 absorbs heat from the lubricating fluid by changing phase. For example, when the temperature of the lubricating fluid reaches a melting point of the phase-change material, the material changes from a solid to a liquid. Unlike conditions that do not involve a phase-change, the temperature of the phase-change material does not increase as a result of absorbing the heat. Likewise, when the temperature of the lubricating fluid falls below the melting point, the material changes from a liquid to a solid while releasing heat. Because the phase-change material does not change in temperature as it absorbs or releases heat, it is particularly effective in controlling the temperature of the lubricating fluid within a narrow temperature range. The composition of the phase-change material can be adjusted such that the melting point is between the normal operating temperature and a maximum operating temperature of the lubricating fluid. For example, between 130-135 degrees Celsius. Alternatively, a phase-change material may be selected that transitions from liquid state to gaseous state at the desired operating temperature. Use of the phase-change material 28 reduces the quantity of fluid necessary to avoid unacceptable temperature increases during periods of peak demand. Reducing the fluid quantity allows the fluid to warm to normal operating temperature more quickly and reduces parasitic pumping losses.

Figure 3:
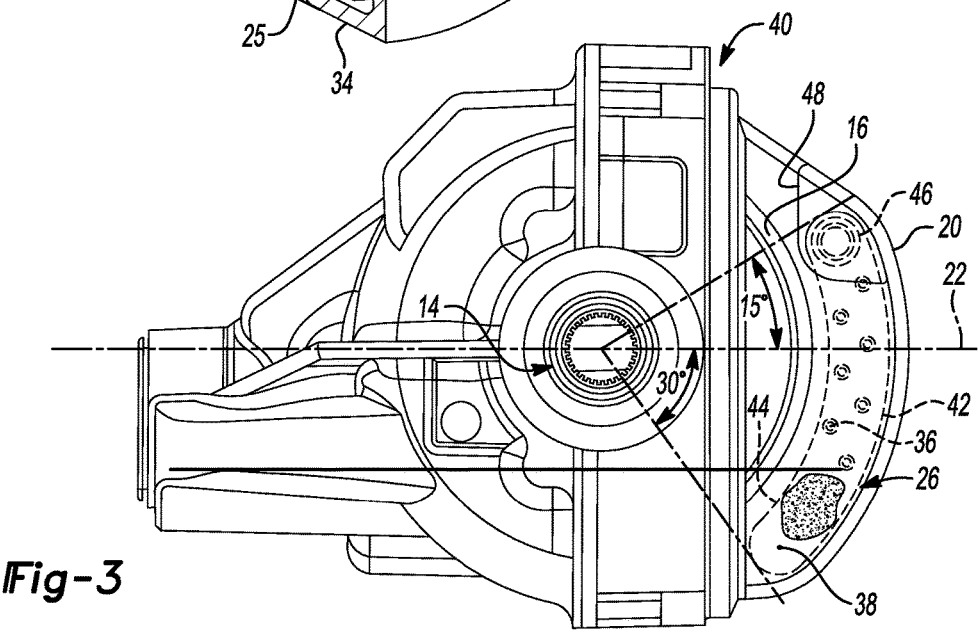
FIG. 3 is a cross-sectional view of an axle housing for a vehicle.

In the embodiment of FIG. 3, the heat absorber 26 is mechanically attached to the cover 20 intersecting the central axis 22. FIG. 3 is a cross-sectional view of the axle assembly taken along lines 2-2 of FIG. 1. In this embodiment, ring gear 16 pumps the lubricating fluid across the heat absorber 26. Specifically, heat absorber 26 may be attached to the cover 20 between 15° above and 30° below central axis 22. Heat absorber 26 may have a plurality of protrusions 36 extending from a first surface 38 of the heat absorber 26. The protrusions 36 may be spaced at regular intervals on a first surface 38 of the container 26. The protrusions 36 increase the surface area available for convective heat transfer between the lubricating fluid and the heat absorber 26. The protrusions 36 may also contain the phase-change material 28. Therefore, when the lubricating fluid contacts the protrusions 36, the phase-change material 28 in the protrusion 36 may further aid to dissipate heat from the lubricating fluid.

Although the protrusions 36 are depicted in FIG. 3 as having a cylindrical cross-section, the protrusions have other cross-sectional shapes such as rectangular. The protrusions 36 are defined vertically at regular intervals. For example, the protrusions 36 may be vertically spaced apart proximate an outer periphery 42 of heat absorber 26. Likewise, the protrusions 36 may be vertically spaced apart proximate an inner periphery 44 of heat absorber 26. The protrusions 36 may define a single column along the outer periphery 42, the inner periphery 44, or about a vertical centerline of heat absorber 26. The protrusions 36 may also utilize a multiple column configuration. For example, the protrusions 36 may be formed proximate the outer periphery 42 as well as the inner periphery 44 in a dual column configuration. A dual column configuration is depicted in FIG. 3.

As depicted in FIG. 3, the protrusions 36 defined adjacent the outer periphery 42 are more numerous than the protrusions 36 defined adjacent the inner periphery 44. It is also contemplated that the protrusions 36 defined adjacent the inner periphery 44 are more numerous than the protrusions 36 defined adjacent the outer periphery 42. And further, the protrusions 36 adjacent the outer periphery 42 are defined having a greater distance between the protrusions 36 relative to the protrusions 36 defined adjacent the inner periphery 44. It is also contemplated that the protrusions 36 adjacent the inner periphery 44 are defined having a greater distance between the protrusions 36 relative to the protrusions 36 defined adjacent the outer periphery 42. In at least one other embodiment, the protrusions 36 in a dual column configuration may be defined with equal spacing and equal number along the outer periphery 42 and the inner periphery 44. With equal spacing, the protrusions 36 may be defined substantially horizontal across the first surface 38 from the outer periphery 42 to the inner periphery 44.

The described dual column configuration as shown in FIG. 3 directs the lubricating fluid in an S-pattern across the first surface 38 of the container 26. Directing the lubricating fluid through the dual column configuration, shown in FIG. 3, alternates contact with the protrusions 36. By alternating contact between the protrusions 36, the container 26 increases contact with the lubricating fluid along the first surface 38. As stated above, increasing contact between the first surface 38 and lubricating fluid further controls the amount of thermal energy dissipated to the phase-change material 28 and ensures the lubricating fluid does not exceed a predefined temperature.

The heat absorber 26 further includes a port 46 defined on the first surface 38 to allow access to the phase-change material 28. The port 46 permits changing the phase-change material 28. As stated above, the phase-change material 28 may be a variety of different materials. Depending on vehicle applications, differing phase-change materials 28 may be used to establish different temperature thresholds. Likewise, the port 46 allows for a combination of phase-change materials 28 to be used within the container 26. Allowing for a combination of phase-change materials 28 also allows for further control of the predefined temperature threshold for the lubricating fluid depending on vehicle application.

The cover 20 further includes an access panel 48 which provides access to the heat absorber 26 for servicing. The access panel 48 eases maintenance and reduces manufacturing costs associated with the installation of the heat absorber 26 on the cover 20. The access panel 48 may also reduce manufacturing and installation time of the differential housing 40. Likewise, the access panel 48 allows for removal of the heat absorber 26. Removing the heat absorber 26 allows for standardization of the housing 40. A single housing 40 may be used with vehicles in which it may be advantageous to install the heat absorber 26 and use the phase-change material 28 as well as with the vehicles in which it may be advantageous to remove the heat absorber 26. The access panel 48 further adds to the adaptability and serviceability of the housing 40, including the cover 20, the heat absorber 26, and the phase-change material 28.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A vehicle axle comprising:
   a housing containing a lubricating fluid; and
   a heat absorber attached to an interior of the housing, containing a phase-change material, and including a plurality of protrusions defined on a first surface of the heat absorber proximate outer and inner peripheries of the first surface to define a dual column configuration on the first surface such that the lubricating fluid alternates contact between the protrusions along the first surface.

2. The axle of claim 1 wherein the phase-change of the phase-change material is from a solid state to a liquid state when the lubricating fluid alternates contact the first surface and from a liquid state to a solid state when the lubricating fluid is static.

3. The axle of claim 1 wherein each of the plurality of protrusions contains the phase-change material.

4. The axle of claim 3 wherein the protrusions are spaced vertically at regular intervals.

5. The axle of claim 3 wherein the protrusions are disposed along a vertical centerline of the heat absorber.

6. The axle of claim 1 further comprising a cover attached to the housing wherein the heat absorber is mechanically fastened to the cover.

7. The axle of claim 6 wherein the cover includes a removable panel on the cover configured to permit access to the heat absorber.

8. The axle of claim 1 wherein the heat absorber defines a fill port on a first surface of the heat absorber.

9. The axle of claim 1 wherein the phase-change material has a melting point between about 130 and 135 degrees Celsius.

10. The axle of claim 1 wherein the phase-change material has a freezing point below about 130 degrees Celsius.

11. The axle of claim 1 wherein the heat absorber is disposed below a static level of the lubricating fluid.

* * * * *